(12) United States Patent  (10) Patent No.: US 8,610,575 B2
Corts et al.  (45) Date of Patent: *Dec. 17, 2013

(54) RFID SYSTEM AND COMPONENTS FOR ROLLING MILL

(75) Inventors: Jochen Corts, Remscheid (DE); Daniel Hackmann, Uetikon am See (CH)

(73) Assignee: Corts Engineering GmbH & Co. KG, Remscheid (DE)

( * ) Notice: Subject to any disclaimer, the term of this patent is extended or adjusted under 35 U.S.C. 154(b) by 193 days.

This patent is subject to a terminal disclaimer.

(21) Appl. No.: 13/075,098

(22) Filed: Mar. 29, 2011

(65) Prior Publication Data

US 2012/0050041 A1   Mar. 1, 2012

Related U.S. Application Data

(63) Continuation-in-part of application No. 12/262,886, filed on Oct. 31, 2008, now Pat. No. 7,916,030.

(60) Provisional application No. 60/984,371, filed on Oct. 31, 2007.

(51) Int. Cl.
   *G08B 13/14*   (2006.01)
(52) U.S. Cl.
   USPC ............... 340/572.1; 340/10.1; 340/10.51
(58) Field of Classification Search
   USPC ........ 340/572.1, 870.01, 870.31, 10.1, 10.42, 340/10.51, 682; 451/5, 49; 72/232, 233, 72/234; 384/7, 8, 19, 428, 548
   See application file for complete search history.

(56) References Cited

U.S. PATENT DOCUMENTS

| 5,038,591 | A | * | 8/1991 | Tajima et al. | 72/13.4 |
| 5,644,942 | A | * | 7/1997 | Bradbury | 72/238 |
| 5,724,846 | A | * | 3/1998 | Wang et al. | 72/237 |
| 6,976,900 | B2 | * | 12/2005 | Bolz | 451/5 |

* cited by examiner

*Primary Examiner* — Toan N Pham
(74) *Attorney, Agent, or Firm* — Briggs and Morgan, P.A.; John F. Klos; Audrey J. Babcock

(57) ABSTRACT

A system and method of use within a rolling facility comprising a plurality of mill stand assemblies with each assembly further comprising components including liners, chock sets, and rolls. An RFID system utilizes RFID tags on each of the plurality of components in order to track and/or monitor characteristics of either the entire mill stand assembly or individual components thereof. An RFID tag reader may be incorporated within a mill stand or may include portable devices. In one embodiment, RFID tag interrogation occurs both at the mill stand and at a remote site at which bearing assembly occurs. A unique combination of mill stand components can be assembled, identified and monitoring during successive rolling campaigns allowing the mill operator to make adjustments toward improving the quality of rolled product.

15 Claims, 9 Drawing Sheets

RFID SYSTEM AND COMPONENTS FOR ROLLING MILL

RELATED APPLICATIONS

This application is a continuation-in-part of U.S. patent application Ser. No. 12/262,886, filed Oct. 31, 2008, which claims the benefit of priority of U.S. Provisional Patent Application No. 60/984,371, filed Oct. 31, 2007, the contents of which are hereby incorporated by reference in their entireties.

FIELD OF THE INVENTION

The present invention relates to an RFID system and tag attached to a component within a rolling stand and, more particularly, to an RFID system that captures and communicates component data to be selectively written or read from a storage area integral with the tag.

BACKGROUND OF THE INVENTION

Conventional roll stands employ a tooling apparatus in the form of a roll set to form a work piece, such as in an ingot. The roll set is held on a roll stand between a pair of bearing assemblies. A bearing assembly typically includes a chock set coupled with a pair of linear bearings, also known as liners. The bearing assemblies, which are installed in opposing spaced-apart relation to one another, cooperate during machine operation to support the roll at respective sides thereof to thereby effect the desired forming activity.

Linear bearings and chock sets have been utilized in metal making processes to support movement of a roll within a roll stand. Linear bearings are used to provide a flat guiding module or plate-type bearing element for rolling frames. These bearings typically have at least one slide-bearing surface which is in contact with another bearing surface. The bearings are subject to wear and tear during operation in the particularly hostile metal forming environment. Embodiments of linear bearings and chocks are disclosed in PCT applications, PCT/EP02/03010 and PCT/EP03/014573, each document being incorporated by reference herein.

An essential part of proper roll stand operation involves maintaining the tolerances of the bearing assemblies. Bearing assemblies in general cannot simply be interchanged and put into use without first giving due consideration to how, and to what extent, the roll stand parameters may need to be tailored and adjusted to accommodate the installed bearing assembly. In particular, each bearing assembly represents a distinct tooling geometry whose corresponding operating specifications must be recognized by the roll stand controller and formulated into the roll stand operating sequence to guarantee that the machine is rendered fit for the scheduled tooling activity and that the roll stand is effectively used in a metal working process. Accordingly, proper roll stand operation requires, among other things, an identification of the particular bearing assembly currently installed, any unique operating guidelines associated with the bearing assembly, and the work piece activity about to the undertaken. Since bearing assemblies typically do not have a universal or standard machine set-up requirement, each bearing assembly may have associated with it a collection of individual data sets each correlated to a specific machine and defining a manner in which the roll stand needs to be configured to achieve structural and operational compatibility with the bearing assembly in use. A need therefore exists to provide a system that supplies the rolling operation controller with the proper bearing assembly-related information before the operation commences.

One approach to supplying such bearing information uses an identification-type tag integrally attached to one of the bearing members and which employs, for example, a bar code or magnetic chip arrangement that contains a coded data pattern uniquely signifying the bearing assembly. The identification code constitutes a search-type key used by a central machine processor to locate and retrieve the bearing assembly information corresponding to the target ID. Such information is typically stored in a memory area associated with the machine processor or at another location remote from the ID tag. These code-type forms of ID tags therefore do not carry or contain the requested bearing information, but instead function simply to provide an identifying key that points the personnel to the location (e.g., memory address) of the associated bearing information.

However, such off-tag placement of the essential bearing set information means that the ID tag itself becomes useless if for reasons such as system failure or communications breakdown the tag-retrieved code is unable to access the central processing facility that houses the code-indexed bearing information. Additionally, measures must be implemented within the storage area to preserve the integrity of the large volumes of bearing assembly data to protect it from corruptibility. Storing the entirety of the bearing assembly information in one single location may present significant risk to continued system operability in the event of a catastrophic failure affecting the consolidated bearing assembly data storage area. A need therefore exists to provide a tag operating independently of the reader device (e.g., machine processor) so that it functions as a content-based source of bearing information. Such an improved tag would compare favorably to current implementations in which no intrinsic bearing information is furnished but rather a key is provided for indexing a central storage area.

There exists a wide variety of information pertaining to the bearing assembly that by its very nature is subject to constant revisioning, such as updatable roll stand reconfiguration requirements and maintenance records critical to proper servicing of the bearing assembly components. The absence of any data recordation feature relating to bearing within current tag embodiments information constitutes a drawback for any roll stand application that needs to be able to update the recorded bearing set information with revisions or changes. Without an update capability, it may not be possible to perform such tag-resident tasks as supplementing the existing data with newly developed bearing information and inserting additional data on reconfiguring the bearing assembly. Accordingly, a need exists to provide a tag that continues to support a data retrieval function (e.g., a readable memory) but that may also permit bearing information to be selectively revised and recorded therein.

Another drawback of conventional tag units concerns the form of interconnectivity required to establish communications between the tag and reader. The type of interface used in certain tag embodiments such as a bar code or magnetic chip involves a direct physical connection between the components, making access to the tag difficult once the bearing components are installed. Even if the tag can be suitably accessed, the need for a direct physical connection nevertheless serves as another design consideration that must be taken into account when integrating the tag into the bearing assembly. A need therefore exists for a system that proposes to eliminate such physical connectivity between the tag and reader device while still supporting communications between the components after installation of the bearing members and the integrally attached tag.

In summary, rolling mills typically contain a large inventory of expensive rolling equipment in the form of discrete parts. The discrete parts include housings, drive train, rolls, chocks, rollneck bearings, hydraulic units and precision flat bearings. Not only are these components expensive to purchase, they are also expensive to maintain at the level necessary to produce quality, high value rolled product. The recording and tracking of these parts using spreadsheets and associated strategies often produces a veritable data and information overflow. While each rolling mill typically has a record of the purchase of these expensive parts, an accurate means of managing and tracking this equipment for maintenance and production purposes has not been available.

SUMMARY OF THE INVENTION

A Component Management System (CMS) in accordance with the present invention makes the administration and optimized use of valuable mill components possible. Checking mill equipment in and out is fast and easy using an RFID system to identify the parts with a handheld device during assembly or disassembly (roll changes included). Not only are the parts automatically identified, the clusters of components needed for a roll set are grouped together for tracking over specific rolling campaigns and under individual rolling conditions.

Furthermore, the results of mill audits, including reports and data from 3D survey results are available instantly within the CMC application. This means that the original condition, e.g., original drawing specs, and the actual status (precisely measured and analyzed) may be viewed, and those data integrated automatically and dynamically into the application. In one embodiment, data analysis from modules such as GAP-Control, Vibration Monitoring, and Coil Inspection are integrated into a heuristic environment of CMS, enabling informed decisions on all levels, from the shop level to management level (for budgeting, for example).

CMS serves as a clearing house and repository for complex data regarding rolling assets. It also provides an integrated and interpretive framework for a wide range of services for measurement, testing, data interpretation and calibration. Integration into an existing ERP or PPS system can be provided CMS gives various levels of management powerful tools for a "techno-commercial" analysis. That is, it connects the deep technical heart of the mill and what exactly is happening there with the mill's real reason for being: to produce high quality product at a high margin.

According to the present invention there is provided an RFID tag for use in a roll stand and which is integrally secured to a mill stand component. In one embodiment of the present invention, the tag includes a reprogrammable storage area preferably provided in the form of a read/write memory for storing information associated with the mill stand component, such information comprising data representing characterizing attributes of the mill stand component. The read/write memory may also store roll stand information representing characterizing attributes of at least one roll stand operatively configurable with the mill stand component. A communications device preferably provided in the form of a transceiver, transmits mill stand component data supplied by the read/write memory and receives data for storage in the read/write memory. The tag preferably establishes a wireless communications link with a monitoring system provided in the form of a reader module associated with the roll stand. The reader includes a transceiver arranged for RF communication with the tag transceiver. Mill stand component data received by the reader from the tag is supplied to a controller, which may also provide the reader with information to transmit to the tag. In another embodiment of the present invention the tag simply includes means for storing or communication a unique identifier, such as in response to an interrogation by a reader upon a roll stand.

Rolling mills for rolling steel and other metals are comprised of multiple rolls for forming metal into sheets. The rolls are supported by bearing assemblies in order to maintain proper surface tolerances on the sheet products. When a bearing assembly is received in a roll shop, an RFID tag may be embedded in a surface of a bearing component, such as a liner.

The roll shop may maintain a database containing a running history of the surface wear and machining performed on the bearing assembly as bearing assembly components may be machined several times during their useful life. A bearing assembly is placed in service in a rolling mill for a period of time, eventually becoming deformed through wear. The bearing assembly is then returned to the shop for repair or replacement. Thus when the bearing assembly is returned to the shop to be repaired, the characteristics of the bearing assembly can be measured.

The roll shop may also maintain a database containing a running history of the surface wear and machining performed on the rolls of the rolling mills. The rolls have a short life cycle, and may be considered the consumables in a rolling mill. Therefore, it is important to trace the rolls in detail.

For the basic components of the rolling mills, including rolls, chock bodies, roller bearings, and linear bearing plates, it is important to be able to acquire and access the relevant data regarding wear and replacement in order to precisely trace the total cost of ownership. Rolls, as consumables, have a relatively short life cycle, while chocks and housing have a relatively long life cycle. The present invention provides a method for acquiring and storing the sets of data associated with different rolling mill components with different life cycles, and for correlating each rolling mill component with its own data set. The ability to store data sets correlated to each of the different rolling mill components allows a user to determine the total cost of ownership of the rolling mill, and provides a basis for a techno-commercial analysis.

A broad spectrum of different maintenance procedures may be followed to guarantee the long term reliability and function of basic components of a rolling mill or complex production facility. These procedures are associated with different components or component clusters. The present invention facilitates correlating the individual components to a general maintenance procedure. Moreover, the present invention provides a reliable procedure for utilizing RFID technology to ensure that necessary maintenance, control, and check-up procedures are followed.

The present invention also allows single rolling mill components of a component group to be "individualized." Specifically, the system of the present invention provides an option to allocate individual performance data, commercial data, and associated information to single members of component groups.

In some embodiments, the present invention uses RFID tags and readers that have a sufficient strength or frequency range to allow RFID tags to be detected in rough, metallic environments. Therefore, in accordance with the present invention, roll shop components bearing RFID tags, such as rolls, chocks and bearings, may be detected using RFID technology in metallic environments, without an impairment of the function and reliability of the RFID technology due to environmental factors. This aspect of embodiments of the present invention provides additional control and security in the storing, organizing and managing of roll shop components, and optimizes inventory management.

Moreover, in accordance with the present invention, wireless networks and technologies such as smart phone software applications may be used to remotely connect operators to the individual performance and location of specific components. This allows relevant information to be provided to decision makers in real time without forcing them to be directly on-site and in touch with the specific components.

In addition, embodiments of the system of the present invention provide the option of integrating a network of RFID tags and related readers, which are connected through a database, into large industrial facilities and environments. This integration may facilitate the creation of a database and communication base for the connection of human operators with the artificial intelligence of the system.

In one embodiment of the present invention, the data related to a bearing assembly and/or roll can be written to a radio frequency identification ("RFID") device and stored. Alternatively, the data can be remotely stored. The RFID device is commonly termed an RFID tag. RFID tags are miniscule microchips, which may be as tiny as half of a grain of sand. A radio frequency transponder system typically includes an RF reader unit and an RFID device. Operation of the RF transponder system is generally characterized by multiple operating modes including excitation, response and read modes. The RF transponder system requires electrical power to operate in each of these modes. In particular, the RF reader unit must be powered during the excitation and read modes while the RFID device must be powered during the response mode. Typically, in RF transponder systems the RFID device is a passive device, i.e., the RFID device lacks an internal power source or physical connection to an external power source. The passive RFID device is powered remotely by the RF reader unit while the RFID device is free of contact with the RF reader unit. An exemplary passive RFID device and its method of operation are disclosed in U.S. Pat. No. 4,730,188 to Milheiser, which reference is incorporated by reference herein. The RF reader unit is conventionally connected to an electrical power source, such as an ac power line, which powers the RF reader unit.

In one embodiment of the present invention, an operator acquires the mill stand component data from the RFID tag using a manual RF reader, by walking from the control desk to the housing portion of a mill stand to hold the RF reader adjacent to the RFID tag, then return to the control desk to transfer the mill stand component data manually into a computerized database. The mill stand environment can be dangerous. It may be undesirable for the operator to stand in the immediate area of the roll stand while performing this manual read operation. This process may create a potential for workplace injuries, and for human error in transferring the data. Also, time saved in transferring the data results in inefficiency in the grinding operation.

In another embodiment, an automated method, system and apparatus for acquiring data from an RFID tag associated with a mill stand component by positioning an RF reader on the roll stand housing is provided.

A system is disclosed for acquiring data from a passive memory device for use in an rolling mill facility. The system comprises a reading means for reading data from the passive memory device, coupled via an interface with a controller.

In a preferred embodiment the reading means comprises a transponder device for exciting an electromagnetic field in a passive memory device when disposed proximate to said passive memory device.

It is an object of the present invention to improve the integrity of mill stand component data entry by eliminating human error associated with manual entry of data during mill stand component assembly, repair, and replacement.

It is an object of the present invention to provide a method and system which provides greater personnel safety by automatically positioning an RF reader adjacent to a roll stand.

Another object of the present invention is to provide a system and apparatus that automatically acquires the information from an RFID tag on a roll stand.

Yet another object of the present invention is to provide a means by which a receiver is moved or retracted when no roll is in position, and is thereby protected from harm due to the movement of large, heavy components into position on a roll stand.

A further object of the present invention is to provide a method, system and apparatus that enables safer environment for acquisition and storage of mill stand component data by reducing personnel proximity to the roll stands.

The invention, in one form thereof, comprises a tag associated with a mill stand component, such tag including a reprogrammable memory and a communication means for transmitting data provided by the reprogrammable memory and for receiving data for providing to the reprogrammable memory, wherein data provided to the tag for storage in the reprogrammable memory includes information associated with the mill stand component. The information associated with the mill stand component, in one form thereof, further comprises information representing characterizing attributes of the mill stand component. The data stored by the reprogrammable memory, in one form thereof, further comprises machine information representing characterizing attributes of at least one roll stand operatively configurable with the mill stand component. The reprogrammable memory, in one form thereof, may include a read/write memory. The communication means, in one form thereof, includes a wireless communications capability. A means is provided for selectively reprogramming the reprogrammable memory using the data received by the communication means.

The invention, in another form thereof, comprises a tag associated with a mill stand component, such tag including a first means for storing data in a modifiable manner and a second means for transmitting data provided by the first means and for receiving data for the first means, wherein data provided to the tag for storage in the first means includes information associated with the mill stand component. The information associated with the mill stand component can further comprise information representing attributes of the mill stand component. The data stored by the first means further comprises machine information representing characterizing attributes of at least one roll stand operatively configurable with the mill stand component.

In one form thereof, the first means includes a read/write memory and the second means includes a wireless communications device. A processor is provided to selectively modify the contents of the first means using the data received by the second means.

The invention, in another form thereof, comprises a tag apparatus associated with a mill stand component, such tag apparatus including a read/write memory and a communications device being arranged in data-transfer relationship with the read/write memory and having a transmit/receive capability, wherein data received by the communications device for transfer to the read/write memory includes information associated with the mill stand component. The information associated with the mill stand component includes information representing attributes of the mill stand component, while the data stored by the read/write memory includes machine information representing characterizing attributes of at least one roll stand operatively configurable with the mill stand component. The communications device may include wireless transmit/receive operating capability. A processor can be provided to selectively reprogram the contents of the read/write memory using data received by the communications device.

The invention, in another form thereof, includes a tag associated with a mill stand component, such tag comprising a storage means for reprogrammably storing data and a communications device being adapted to transmit data provided by the storage means and being adapted to receive data for providing to the storage means, wherein data provided to the tag for storage in the storage means includes information associated with the mill stand component. The information associated with the mill stand component includes information representing attributes of the mill stand component, while the data stored by the storage means includes machine information representing characterizing attributes of at least one roll stand operatively configurable with the mill stand component.

The storage means, in one form thereof, includes a read/write memory. The communications device includes a wireless transmit/receive operating capability. A means is provided for selectively reprogramming the storage means using the data received by the communications device.

The invention, in yet another form thereof, is directed to a system for use with a roll stand associated with a mill stand component, such system comprising a tag integrally associated with the mill stand component, the tag including a reprogrammable memory, wherein data provided to the tag for storage in the reprogrammable memory including information associated with the mill stand component, and a communications device arranged in data-transfer relationship with the reprogrammable memory and having a transmit/receive capability; and a communication means associated with the roll stand and arranged to establish with the communications device of the tag a communications link. The information associated with the mill stand component includes information representing characterizing attributes of the mill stand component, while the data stored by the reprogrammable memory includes machine information representing characterizing attributes of at least one roll stand operatively configurable with the mill stand component.

The communications device of the tag and the communication means associated with the roll stand, in one form thereof, establish a wireless link. The reprogrammable memory, in one form thereof, includes a read/write memory. There is further provided a means, arranged for communication with a controller associated with the roll stand, for providing the communication means with information associated with the mill stand component for transmission to the tag.

The invention, in another form thereof, includes a system for use with a roll stand associated with a mill stand component. The system includes a tag integrally associated with the mill stand component, such tag comprising a first means for storing data in a modifiable manner, wherein data provided to the tag for storage in the first means including information associated with the mill stand component, and a second means for transmitting data provided by the first means and for receiving data for the first means; and a reader associated with the roll stand, such reader comprising a third means arranged for establishing with the second means of the tag a communications link. The information associated with the mill stand component includes information representing characterizing attributes of the mill stand component, while the data stored by the first means includes machine information representing characterizing attributes of at least one roll stand operatively configurable with the mill stand component.

The first means of the tag, in one form thereof, includes a read/write memory. The second means of the tag and the third means of the reader establish a wireless communications link therebetween. There is further provided a processor, associated with the tag, to selectively modify the contents of the first means using the data received by the second means. The reader further includes a fourth means, arranged for communication with a controller associated with the roll stand, for providing the third means of the reader with information associated with the mill stand component for transmission to the tag.

The invention, in another form thereof, comprises an apparatus for use with a roll stand associated with a mill stand component. The apparatus includes a read/write memory integrally associated with the mill stand component, wherein data provided to the read/write memory for storage therein including information associated with the mill stand component; a first communications device integrally associated with the mill stand component, the first communications device being arranged in data communicative relationship with the read/write memory and having a transmit/receive capability; and a second communications device associated with the roll stand, the second communications device being arranged to provide a communications link with the first communications device. The information associated with the mill stand component includes information representing characterizing attributes of the mill stand component, while the data stored by the read/write memory includes machine information representing characterizing attributes of at least one roll stand operatively configurable with the mill stand component.

The communications link provided by the first communications device and the second communications device includes a wireless link. The system further includes a processor integrally associated with the second communications device and arranged for communication with a controller associated with the roll stand. There is provided an auxiliary storage device arranged to selectively receive data received by the second communications device from the first communications device.

The invention, in yet another form thereof, includes a system for use with a roll stand associated with a mill stand component, such system comprising a tag integrally associated with the mill stand component, the tag including a storage means for reprogrammably storing data, wherein data provided to the tag for storage in the storage means includes information associated with the mill stand component, and a first transmit/receive communications means arranged in data-transfer relationship with the storage means; and a reader associated with the roll stand, the reader comprising a second transmit/receive communications means arranged to establish with the first transmit/receive communications means of the tag a communications link. The information associated with the mill stand component includes information representing characterizing attributes of the mill stand component, while the data stored by the storage means includes machine information representing characterizing attributes of at least one roll stand operatively configurable with the mill stand component.

One advantage of a system in accordance with the present invention is that the improved tag configuration enables information regarding a mill stand component to be selectively read from and/or written to the reprogrammable storage area.

Another advantage of a system in accordance with the present invention is that information regarding a mill stand component stored locally within the tag can be selectively and continuously reprogrammed, permitting a range of mill stand component data operations heretofore not available, such as updates, deletions, insertions, additions, changes, revisions, counters, and other forms of modifications.

Another advantage of the present invention is that the tag can store an expandable and modifiable number of mill stand component configuration data sets that facilitates rapid reconfiguration of the roll stand by simply accessing the machine-specific data from the tag memory and forwarding this information to the controller.

A further advantage of the invention is that the communications link established between the tag and reader permits a more complete exchange of information, which increases the efficiency and accuracy of the mill stand component installation and reconfiguration activities and provides both the tag and reader with the ability to dynamically revise and modify their respective storage areas with the most recently updated information.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

In the accompanying drawings which form part of the specification and wherein like numerals and letters refer to like parts wherever they occur.

DETAILED DESCRIPTION OF THE INVENTION

Figure 1:
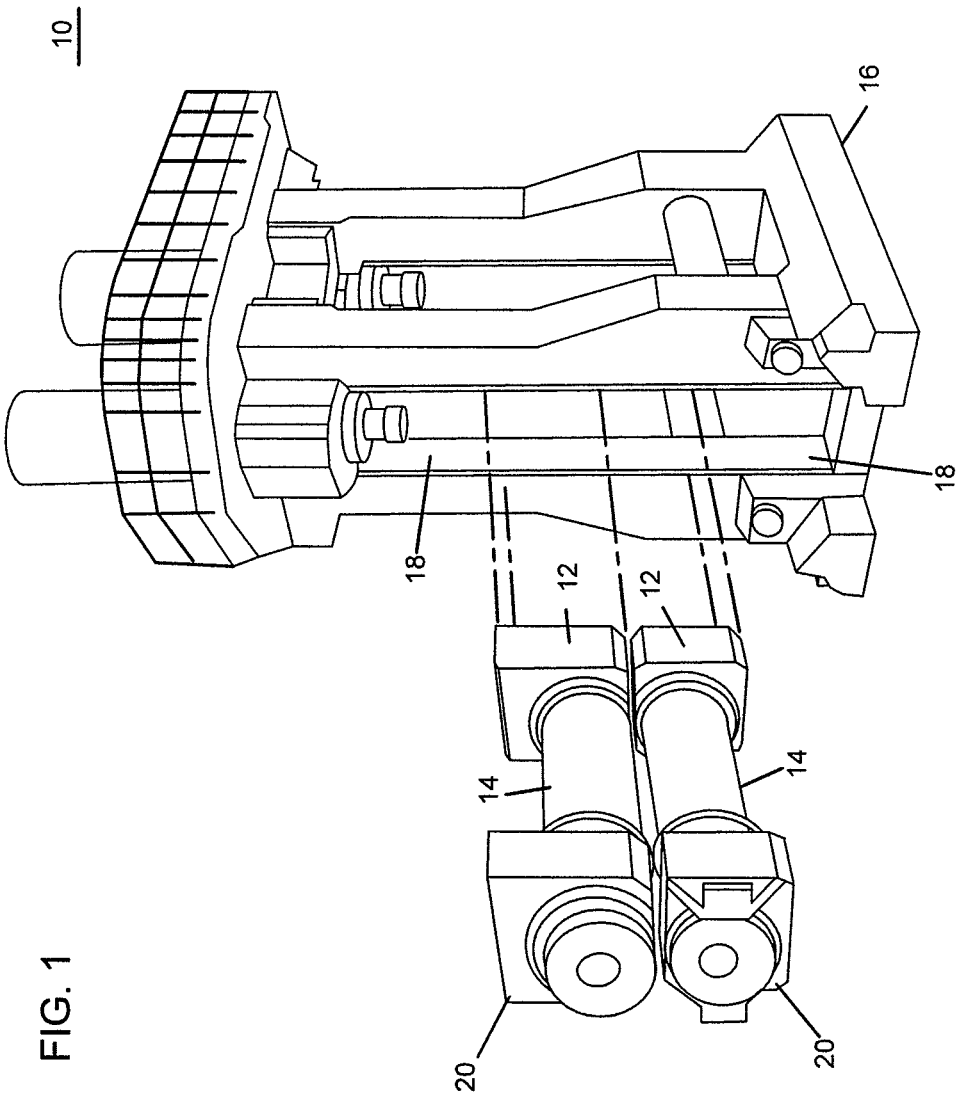
FIG. 1 is a perspective illustration of a mill stand and related components.

FIG. 1 provides a perspective view of a mill stand 10 incorporating linear bearings (or "liners") 12, with the pair of working rolls 14 depicted in a removed state relative to the mill stand (or "roll stand") housing 16. During use, the linear bearings 12 engage linear bearings 18 attached to the roll stand housing 16 to limit movement of the rolls 14 to a generally horizontal direction. The bearings 18 may include lubricant ports supplied via a lubrication delivery system as described in additional detail herein. Embodiments of linear bearings 12, 18 are disclosed in PCT applications, PCT/EP02/03010 and PCT/EP03/014573, each document being incorporated by reference herein. Additional linear bearings adaptable for use within a system in accordance with the present invention may be provided by Josua CORTS Sohn, Bearing Technology Division, of Remscheid Del.

The roll stand 10 of FIG. 1 is described herein for illustrative purposes only as it should be apparent that the tag according to the present invention may be used in conjunction with any type of roll stand.

Roll stand 10 includes a pair of bearing assemblies for supporting the roll 14 within the roll stand housing 16. The bearing assembly includes chocks 20 and linear bearing plates 12, 18. The bearing assemblies, as so arranged in their opposing spaced-apart relationship, cooperate in a known manner during operation to process a work piece passing through the roll stand 10. The chock 20 set and linear bearings 12, 18 together constitute a bearing assembly in which an RFID tag utilized in accordance with the present invention is integrally secured to at least one of the bearing assembly members. The present invention is not limited to any particular form or type of bearing assembly but may be integrated with any bearing assembly arrangement.

Figure 2:
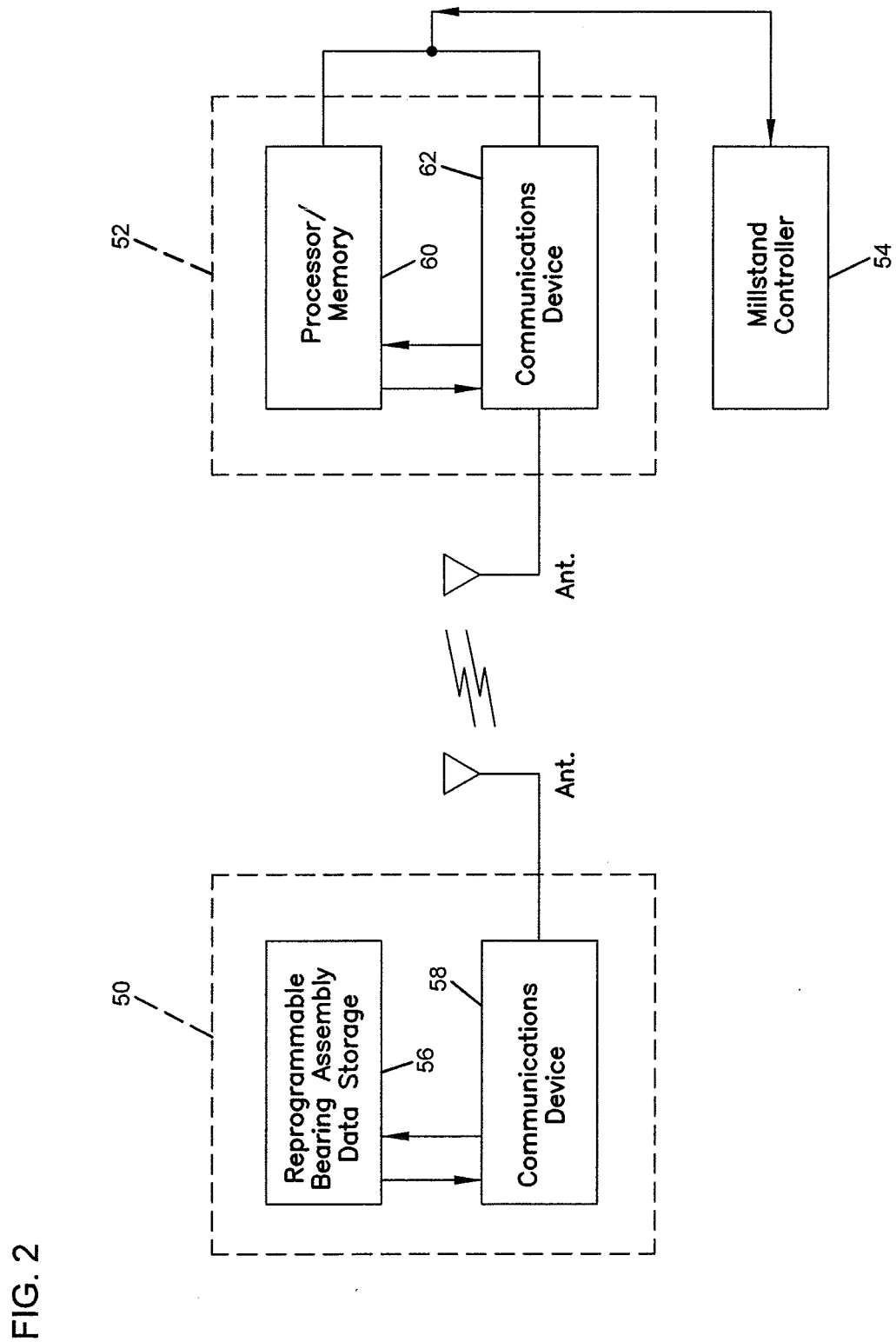
FIG. 2 is a flow chart depiction of one embodiment of the present invention.

Referring now to the drawings and particularly to FIG. 2, there is shown in block diagram format a system according to the present invention for use in a roll stand and, more specifically, in association with a bearing assembly configured with the roll stand. The illustrated system includes a tag module 50 integrally associated with the bearing assembly and arranged for secured attachment to at least one of the bearing assembly members. The system further includes a reader module 52 arranged for communication with tag module 50 to establish, in combination, a communications link in which data may be exchanged between the illustrated units, such as information relating to the installed bearing assembly. Reader 52, in one form thereof, is attached to the roll stand and disposed for communication with controller 54.

In one embodiment, tag 50 provides a means by which information associated with a mill stand component can be dynamically and controllably stored. The mill stand component may be, for example, a roll, chock set, or linear bearing. In another embodiment, tag 50 simply provides an identifier to a reader module, such as in response to an interrogation signal from the reader module.

As used herein, the reprogrammable feature should be understood as encompassing the entire range of data processing/manipulation methods and programming functions connected with the storage, recordation, modification, and retrieval of data. In particular, tag 50 provides, in one form thereof, a reprogrammable memory that enables data operations to be performed, particularly with respect to information associated with the installed mill stand component, which include, but are not limited to, operations allowing data to be stored, altered, supplemented, inserted, saved, added, removed, modified, counted, accumulated, or otherwise processed. As will be described below, this reprogrammability finds notable advantages with respect to the treatment of data concerning the mill stand component to which tag 50 is attached, although this particular aspect should not be considered in limitation of the present invention as any other type of information may be processed in an equivalent manner, e.g., roll stand reconfiguration data. Tag 50, in one alternative understanding, may be considered as providing a means for storing data in a modifiable manner. Additionally, tag 50, in another alternative understanding, may be considered as supporting a functionality enabling data to be selectively written to and read from an integral storage area.

As used herein, references to information associated with a mill stand component relate to categories of data including, among other things, information linked specifically to a corresponding mill stand component and representing an attribute thereof ("component-characteristic data") and information not specifically disclosing a defining attribute of the mill stand component but representing information that is dependent upon a particular set of mill stand components ("component-dependent data"). Such component-related data relate to information representing characterizing attributes of the mill stand components and may include, but are not limited to, maintenance information concerning the number of parts and/or work pieces manufactured or processed by the relevant mill stand component; safety, diagnostic, warranty and other manufacturer-provided servicing information; specification data describing the geometry, structure, and other physical properties of the mill stand components (e.g., material, mechanical design); and other information that by its nature and relation to the mill stand components constitutes an attribute or parameter which proposes to characterize an identifiable set of mill stand components or represents an intrinsic characteristic of a mill stand component for uniquely and/or distinctly identifying or describing it.

Component-dependent data relates to information that is specifically associated with an identifiable set of mill stand components but which does not propose to represent an attribute intrinsic to the mill stand components. For example, component-dependent data may include, but is not limited to, information relating to the manner of configuring the roll stand to accommodate the mill stand component currently in use. This information may encompass structural and/or mechanical reconfiguration data for modifying the roll stand arrangement in accordance with the mill stand component; and operational data governing the manner of how to control the roll stand to ensure that the roll stand and mill stand component cooperate effectively in performing the tooling activity. In this regard, component-dependent data may be considered to include, in one form thereof, machine information representing characterizing attributes of a distinct roll stand operatively configurable with the mill stand component. Plural sets of such machine information are associated with the mill stand component and saved in tag 50 to facilitate the installation of the mill stand component in a corresponding array of roll stands. In particular, tag 50 may enable data to be stored therein concerning information for loading the accompanying mill stand component to a number of different roll stands. Machine information such as the reconfiguration data more properly characterizes attributes of the roll stand, although the attributes themselves are a function of (i.e., dependent upon) the mill stand component in use. The advantage obtained by storing such multi-machine component-loading information in tag 50 lies in the immediate availability of all of the necessary information for quickly reconfiguring the roll stand into which the attached mill stand component is installed.

In accordance with another aspect of the present invention, it should be understood that the mill stand component information includes individual data items of a type that may be considered fixed (i.e., typically not subject to change) and variable (i.e., subject to change and/or modification). Further examples of information associated with the mill stand component include, but are not limited to, serial number; total parts made with the mill stand component, and feed rate.

The purpose of the roll stand is to flatten the material as it is being passed therethrough. There may be specific dimensions of setup information which is recalled with the information associated with the mill stand component.

Referring to FIG. 2, tag 50 includes a reprogrammable bearing assembly data storage 56 arranged in data-transfer relationship with a communications device 58. These components are preferably arranged in integral combination to form a single, integrated module. The integrated tag module is preferably integrally secured to one of the bearing assembly members by any suitable attachment technique of conventional application, although it should be understood that the manner of such attachment does not form part of the present invention and therefore should not be viewed in limitation thereof. The manner of attachment, in one aspect thereof, is selected with a view towards facilitating and permitting communications between tag 50 and reader 52. Although FIG. 2 relates to a system in which a tag is secured to a bearing assembly member, in other embodiments a tag may be secured to other mill stand components, such as rolls.

The illustrated reprogrammable storage 56 is provided in the form of a storage or memory area embodying a functionality that permits data, in a general sense, to be selectively read from and written to the memory area. Reprogrammable storage 56, in one aspect thereof, allows data to be stored therein in any conventional manner suitable for retrieval (i.e., in connection with a read function), preferably in a non-volatile recording format. Such data recordation encompasses not only any initial programming of the memory area but also any dynamic reformatting of the memory area (e.g., inserting additional or supplemental data) during operation of tag 50. Reprogrammable storage 56, in another aspect thereof, supports the ability of data stored therein to be processed in a manner including, but not limited to, reprogramming operations such as data revisions, modifications, alterations, substitutions, replacements, updates, and/or erasures, whether executed individually, in sequence, or in selected combination thereof.

Reprogrammable storage 56 should be considered as encompassing any means having a readable/rewritable feature in regard to the management, storage, recordation, retrieval, and modification/alteration of data. The reprogrammability may be in forms including, but not limited to, implementations based on hardwiring (e.g., hardware-based), firmware, software, or any combination thereof. For example, reprogrammable storage 56 may be reprogrammed by using standard reprogramming circuitry that connects directly to storage 56 or by invoking a software function that executes the appropriate instruction sets to carry out the selected data operation. The data that is applied to reprogrammable storage 56, in a preferred form thereof, arrives by way of transmissions from reader 52 to tag 50 over the communications link. Reprogrammable storage 56, in illustrative forms thereof, may be provided in the form of a read/write memory, an electrically-erasable-programmable read-only memory (EEPROM), or any other reprogrammable type of memory. Reprogrammable storage 56 may be accompanied by or have incorporated therein a memory portion that constitutes a non-reprogrammable type of memory (e.g., a strictly read-only memory). The reprogramming of reprogrammable storage 56, in a preferred form thereof, occurs in response to and in accordance with the data provided to tag 50 from reader 52 over the communications link.

In accordance with another aspect of the present invention, the data-modifiable feature of reprogrammable storage 56 is particularly effective and applicable to mill stand component information, both of the component-characteristic and component-dependent types, that remains subject to review and possible updating/modifying during the course of communication activity involving tag 50, either by way of user input or in a more controlled way through operation of controller 54 or another processor-type arrangement. For example, reprogrammable storage 56 may be continuously updated with revisions reflecting any changes to the current total of parts made with the corresponding mill stand component, in which such revisions are preferably provided to tag 50 from reader 52 over the bi-directional communications link.

The illustrated communications device 58 is arranged to transmit data provided by reprogrammable storage 56 and to provide reprogrammable storage 56 with data it receives. The transmission and reception of data by communications device 58 occurs in connection with the bi-directional communications link established with reader 52. The communications link is preferably of the wireless type, although other forms of communication are possible provided that the communications devices are suitably adapted for such use. In a wireless implementation, communications device 58 is preferably provided in the form of an RF transceiver. Conventional means (not shown) are used to implement whatever communication and signal processing techniques are deemed appropriate or suitable, such as signal modulation/demodulation and data encoding/decoding, particularly if data communications occur in a digital format. These system parameters, however, do not form a part of the present invention and should not be used in limitation thereof.

Referring to FIG. 2, the illustrated reader 52 represents the module with which tag 50 communicates in the manner of exchanging data therebetween. Accordingly, reader 52 encompasses other such arrangements or means that establish with tag 50 a communications link. Reader 52 is preferably associated (e.g., integrally arranged) with the particular roll stand in which is configured the bearing assembly having tag 50 secured thereto. Reader 52, in one illustrative form thereof, includes a processor/storage device 60 and communications device 62, which is arranged for communication with communications device 58 of tag 50 to establish the communications link therebetween. Communications device 62 is preferably provided in the form of an RF transceiver. Processor 60 represents a means by which data received by communications device 62 can be processed and stored therein or forwarded to another subsystem, such as controller 54 or a supplemental storage location. Processor 60, in another mode thereof, can function to provide communications device 62 with data for transmission to tag 50. Such transmissible data may originate from processor 60, controller 54, or some other data-providing means (e.g., a user-activated input device) and preferably constitutes bearing information associated with the bearing assembly, in accordance with the present invention. In the event communications device 62 is arranged to communicate directly with controller 54, processor 60 may be considered optional.

During operation, any number and type of requests for data, responses to such data interrogations, and exchanges of data, particularly bearing information associated with the bearing assembly, are supportable by the illustrated system comprising tag 50 and reader 52. For example, after the bearing assembly and integrally attached tag 50 are installed in the designated roll stand, controller 54 may initiate a request for data from tag 50 with regard to information stored therein detailing the manner of reconfiguring the roll stand to accommodate the installed bearing assembly. This request, suitably formatted, is transmitted by communications device 62 to tag 50. At tag 50, communications device 58 receives the incoming transmission and provides the imbedded data request to reprogrammable storage 56, whereupon the proper data is retrieved therefrom in accordance with the data request, forwarded to communications device 58 for return transmission to communications device 62 in reader 52, and ultimately provided to controller 54, which uses the information to implement any indicated reconfiguration requirements.

One embodiment of the present invention is directed to providing tag 50 with reprogrammable storage 56 and arranging tag 50 for communication with reader 52 essentially serve to provide tag 50 with a configuration that enables it to function, in a preferred form thereof, as a single-source, content-based provider of modifiable data, which realizes its most important advantages in regard to the storage and processing of mill stand component information associated with the mill stand component.

Yet another embodiment of the invention is directed to a system wherein tag 50 provides an identifier to reader 52 and a remote system, for example located in the control room, stores information related to the use of the mill stand component associated with the particular tag 50.

As a result, mill stand component information pertaining to the mill stand component may be contained within tag 50 or at a remote controller. Single sourcing of all mill stand component information (i.e., fixed and variable) enables controller 54 and other networked devices to have a single site from which any necessary mill stand component information can be retrieved thereby simplifying the accompanying data access and retrieval functions.

Figure 3:
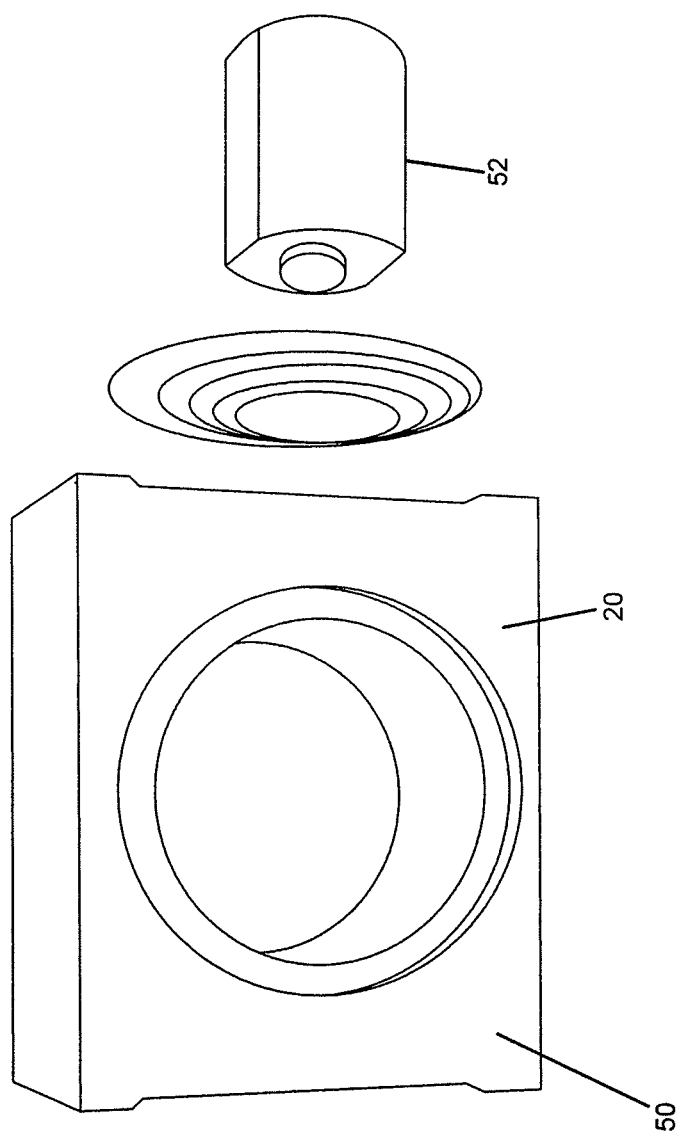
FIG. 3 is an illustration depicting interrogation of an RFID tag on a chock set.
Figure 4:
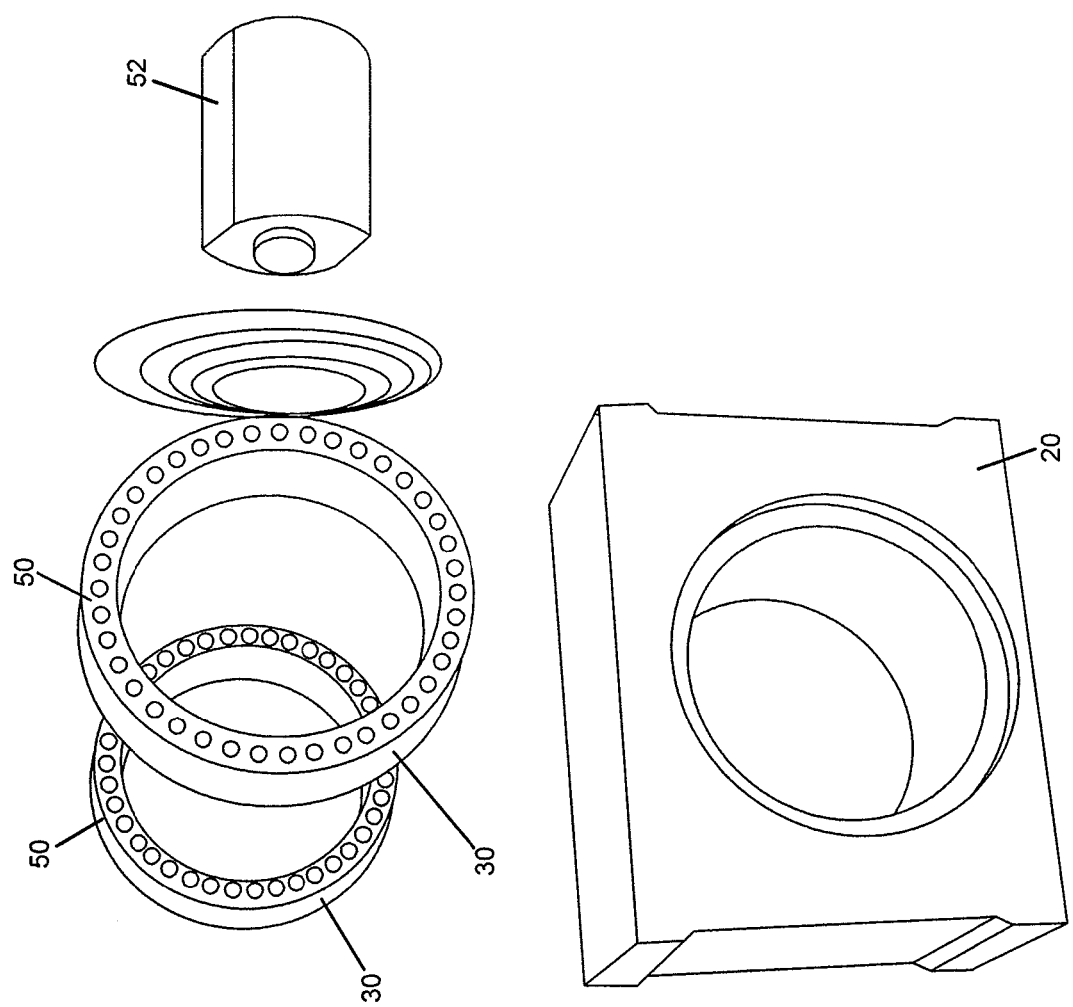
FIG. 4 is an illustration depicting interrogation of an RFID tag on bearing components adapted for use with the chock set of FIG. 3.
Figure 5:
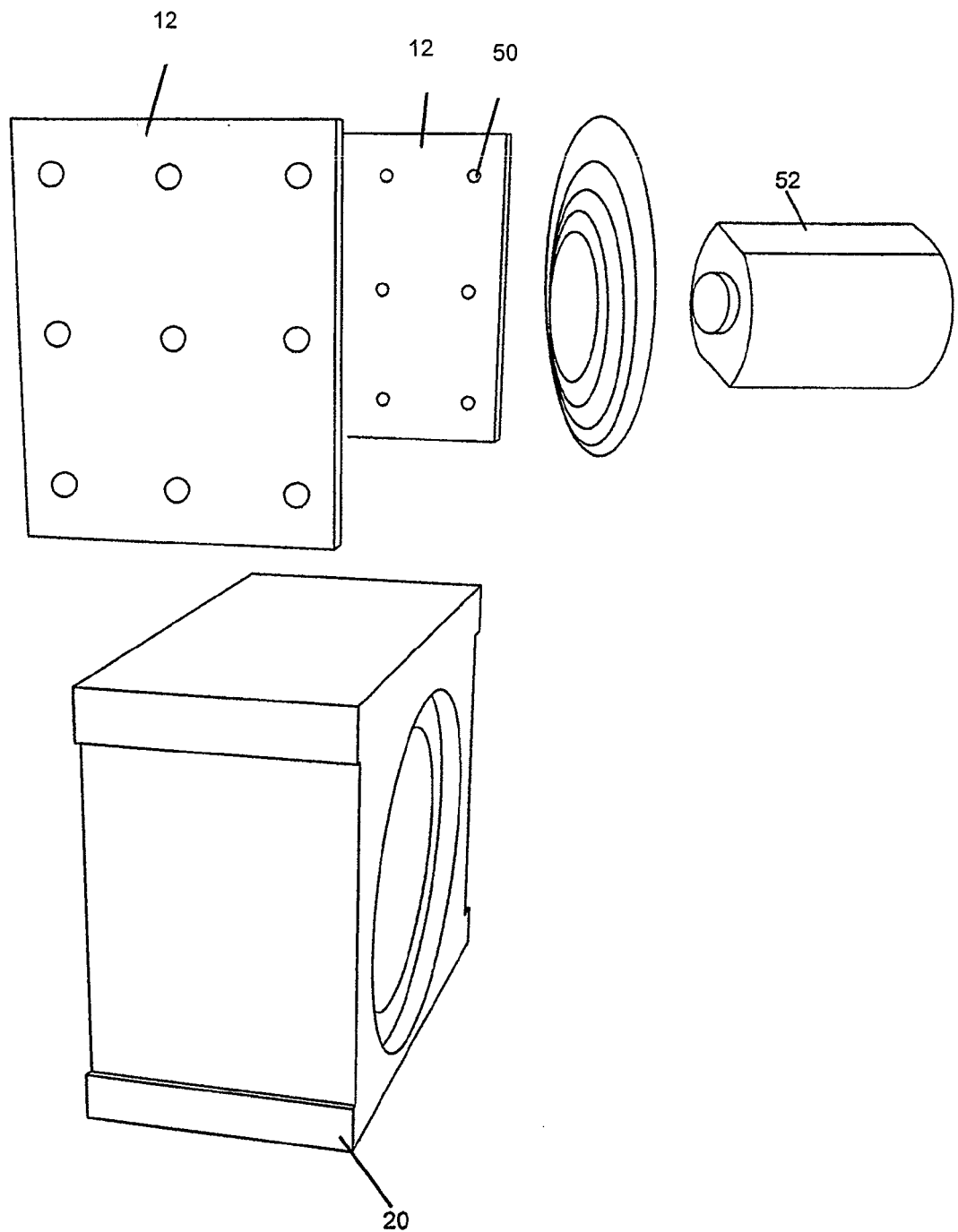
FIG. 5 is an illustration depicting interrogation of an RFID tag on a liner plate adapted for use with the chock set of FIG. 3.
Figure 6:
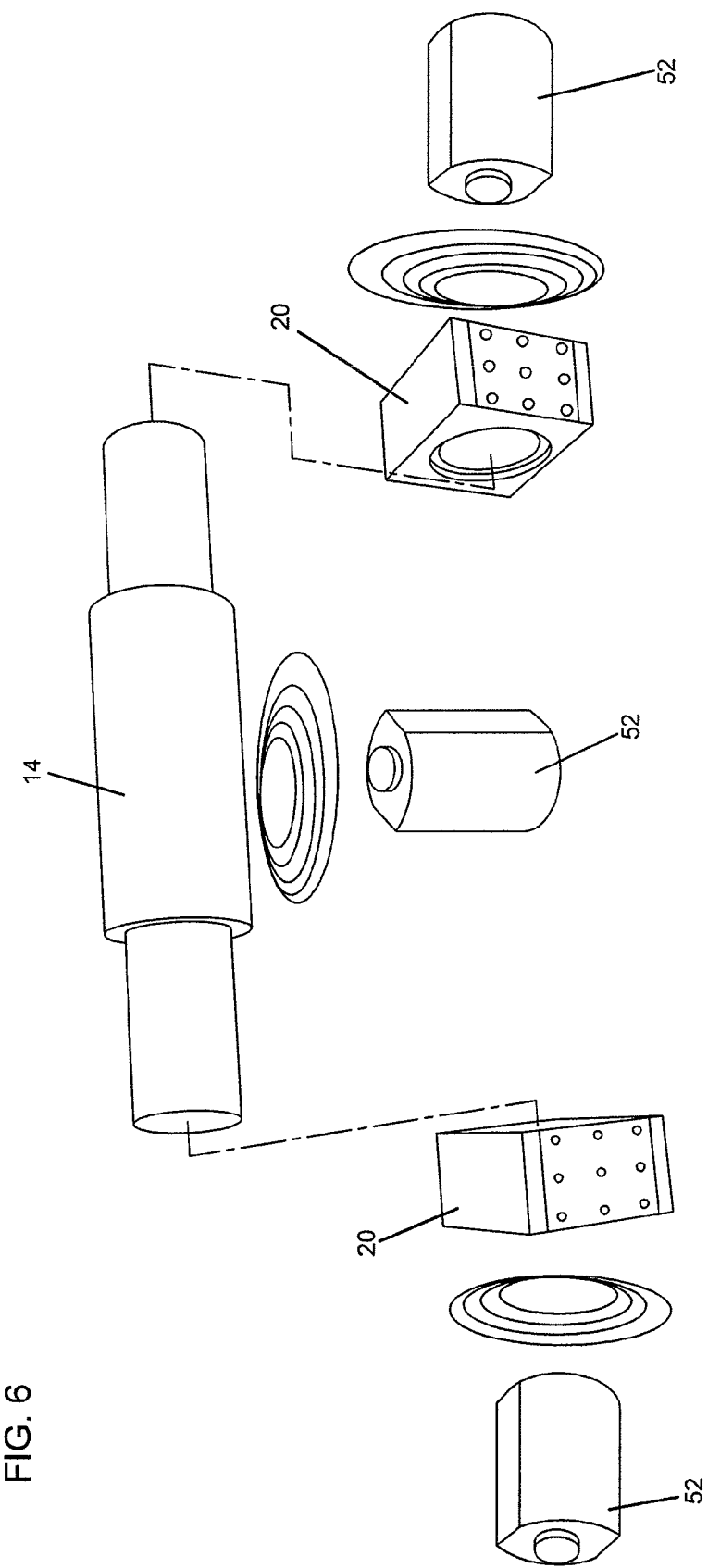
FIG. 6 is an illustration depicting interrogation of RFID tags on bearing components adapted for use with the chock set of FIG. 3 and a work roll.
Figure 7:
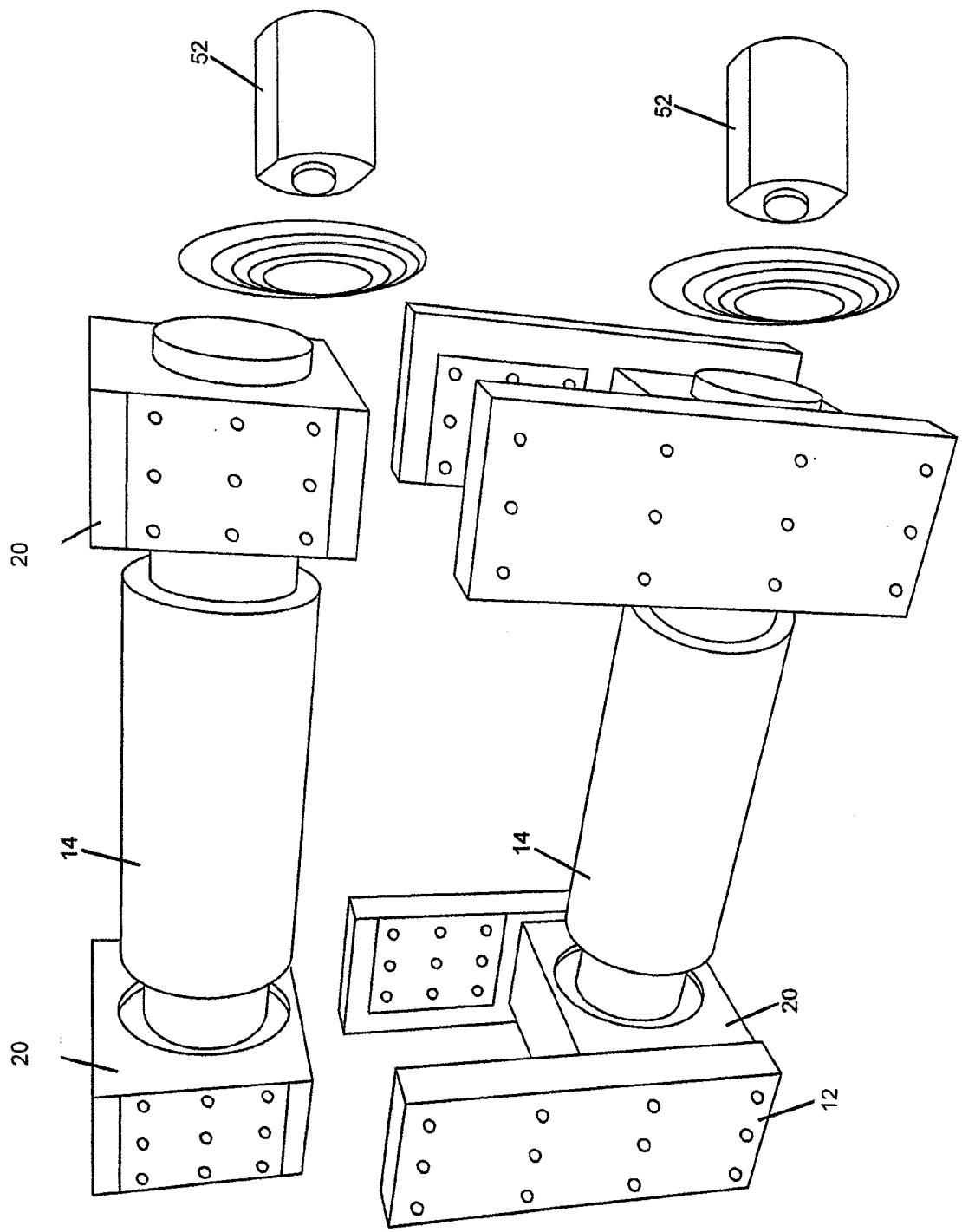
FIG. 7 is an illustration depicting interrogation of RFID tags on bearing components adapted for use with a plurality of chock set of FIG. 3, two work rolls, and mill stand liners.

FIG. 3 depicts a data exchange between a tag 50 on a chock 20 of a roll stand bearing assembly and an RFID tag reader 52. Tag reader 52 may be a hand-held device or may be attached to a roll stand housing 16. FIG. 4 depicts a data exchange between RFID tags 50 on a pair of roller bearings 30 of the bearing assembly and an RFID reader 52. FIG. 5 depicts a data exchange between one or more of the liners 12 of a roll stand bearing assembly and an RFID reader 52, such as during a set-up procedure of a top work roll 14 chock 20. FIG. 6 depicts data exchange between a roll 14 and pair of bearing assemblies and an RFID reader 52, such as during assembly of the top work roll 14 and bearing assemblies. FIG. 7 depicts a complete work-roll set in communication with an RFID reader 52.

Figure 8:
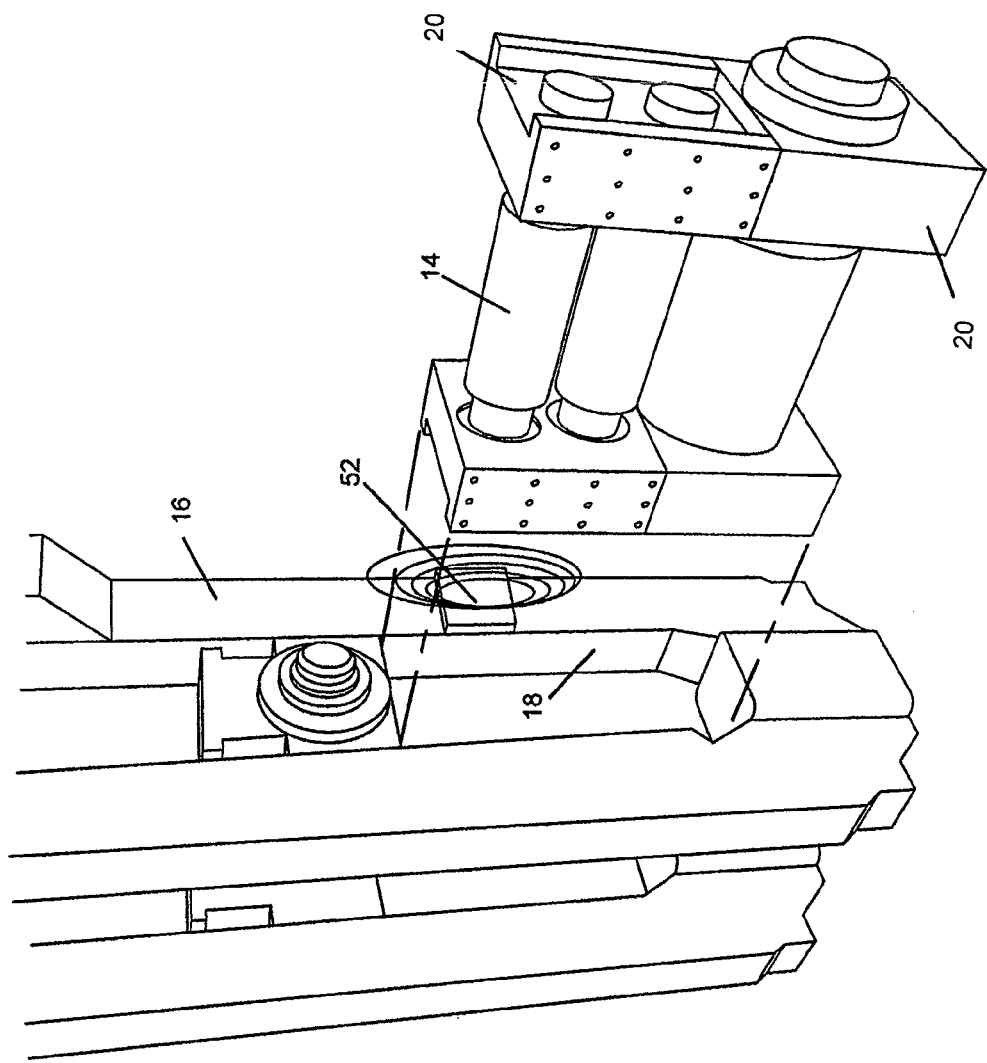
FIG. 8 is an illustration depicting interrogation of an RFID tag as a work-roll set is inserted into or removed from a mill stand housing.

FIG. 8 depicts a hand-off procedure wherein the assembled roll set is placed into the roll stand housing 16, such as during a repair procedure. An RFID tag reader 52 is attached to the roll stand housing 16 in order to effectively communicate with one or more RFID tags 50 within the work-roll set. Tag reader 52 may interrogate one or more RFID tags 50 within the roll set. In one embodiment of the invention, tag reader 52 reads one RFID tag 50 on a given set and controller 54 is able to identify each and every component within the mill stand assembly, wherein the mill stand assembly includes at least one roll, chock set, and liner. In such an embodiment, the controller 54 has previously associated the different RFID tags 50 on the components of a given mill stand assembly, such as during a repair procedure at a remote site. Because one or more tags 50 may not be read by the RFID tag reader 52 when a mill stand assembly is inserted in the roll stand, it is particularly advantageous to associated multiple different mill stand components to one or more RFID tags 50 that are able to be read by a tag reader 52 on the roll stand.

Stored in a tag may be initial information pertaining to a mill stand component before, for example, the factory ship-out of the mill stand component. This initial information may include specific data on manufacturing factors of the mill stand component, and the initial information may include manufacturing history data such as design values and actually-measured values of mill stand components, for example, initial values of assembly precisions, manufacture numbers, etc. of these elements. Also, additional information is information can be added by requests from the user side or service, etc. The information may comprise basic data on the completed mill stand component, such as dimension data. Data showing the use conditions of the mill stand component such as allowable temperature and allowable load can be also stored in the memory.

Figure 10:
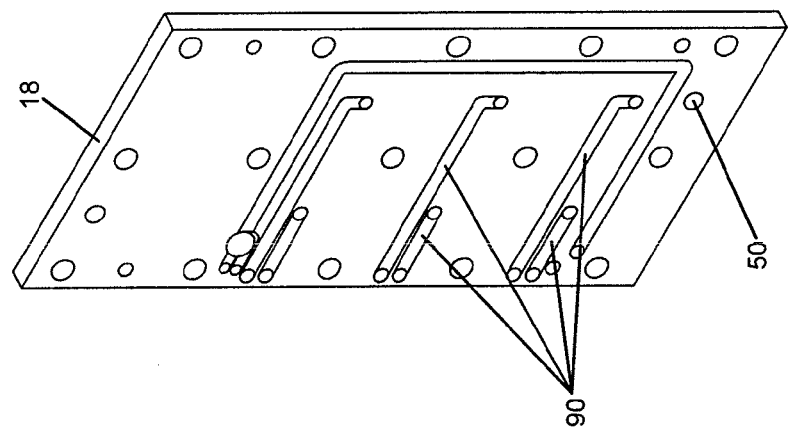
FIG. 10 is a perspective view of the liner plate of FIG. 9.
Figure 9:
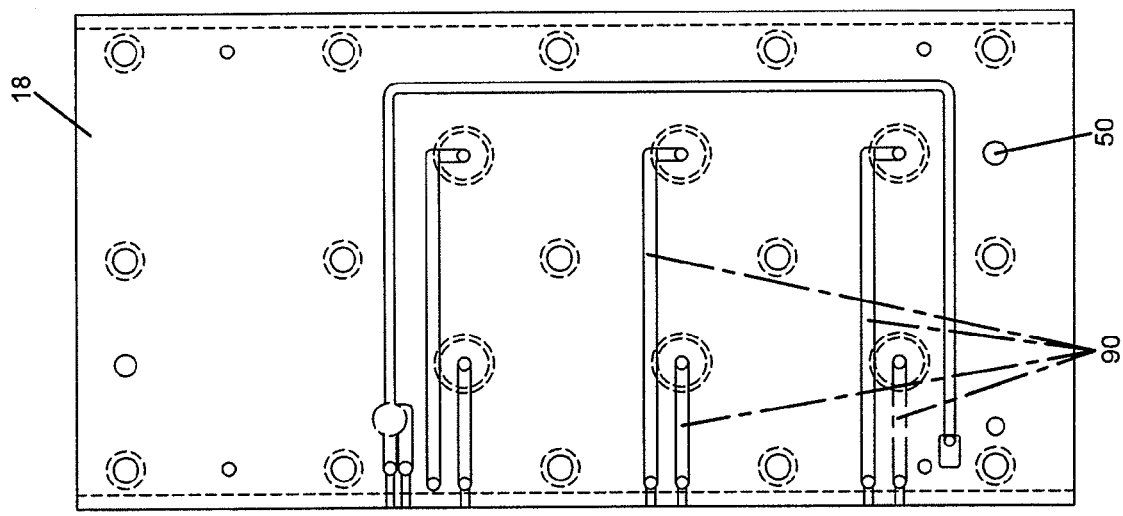
FIG. 9 is a plan view of a liner plate having an RFID tag positioned below a bearing surface.

FIGS. 9 and 10 depict a liner 18 including a plurality of lubrication channels 90 and an RFID tag 50. Suitable coverings are applied to protect the tag 50 during operation of the mill stand 10.

Although the present invention and its advantages have been described in detail, it should be understood that various changes, substitutions and alterations can be made herein without departing from the spirit and scope of the invention as defined by the appended claims. For example, while some of the embodiments of the RFID tag 50 described above reference a bi-directional communication system, other embodiments of the present invention may utilize an RFID tag 50 that is merely interrogated by a reader, e.g., no information other than a unique identifier is stored or conveyed to the reader. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A rolling facility comprising:
  a plurality of mill stands;
  a plurality of work rolls adapted to be inserted into or removed from said plurality of mill stands during a rolling campaign;
  a plurality of chock sets holding bearings adapted to support the plurality of work rolls on the plurality of mill stands;
  a plurality of liners, with some of the liners adapted for attachment on the plurality of chock sets and other of the liners adapted for attachment on housings of the plurality of mill stands, with said plurality of liners engaging each other to limit movement of the plurality of work rolls to a generally vertical direction, with at least one of the plurality of work rolls, chock sets and liners being combined into a unique mill stand assembly;
  a plurality of RFID tags attached to the plurality of work rolls, the plurality of chock sets and the plurality of liners;
  a RFID tag reader adapted to interrogate each of the plurality of RFID tags; and
  a controller in communication with the RFID tag reader, wherein said controller is adapted to use information associated with at least one of the plurality of RFID tags to make a physical adjustment to a mill stand component so as to improve rolled product quality.

2. The rolling facility of claim 1 wherein the RFID tag reader includes a portable tag reader used at a remote assembly facility during a dis-assembly process by which components of the unique mill stand assembly are separated from each other.

3. The rolling facility of claim 2 wherein the RFID tag reader is adapted to interrogate each RFID tag of the components prior to subsequent storage, maintenance or replacement.

4. The rolling facility of claim 1 wherein the RFID tag reader is attached to one of the plurality of mill stands.

5. The rolling facility of claim 4 wherein the RFID tag reader is attached at a mill stand housing.

6. The rolling facility of claim 1 wherein the rolling facility is adapted to update information associated with the unique mill stand assembly when the unique mill stand assembly has been reworked at a remote facility.

7. The rolling facility of claim 1 wherein the rolling facility is adapted to update information associated with the unique mill stand assembly when the unique mill stand assembly is inserted into one of the plurality of mill stands.

8. The rolling facility of claim 1 wherein the RFID tag reader is adapted to interrogate fewer than all of the RFID tags associated with the unique mill stand assembly as said unique mill stand assembly is inserted into one of the plurality of mill stands.

9. The rolling facility of claim 8 wherein the controller is adapted to receive information relating to one of the RFID tags associated with the unique mill stand assembly and thereafter access information relating to more than one of the components of the unique mill stand assembly.

10. The rolling facility of claim 1 wherein information associated with the unique mill stand assembly is adapted to be used by a mill operator to make adjustments to one of the plurality of mill stands, said adjustments including modifying a position of one of the plurality of work rolls relative to one of the plurality of mill stands.

11. A method of operating a rolling facility comprising:
  attaching a RFID tag to each of a plurality of work rolls, chock sets and liners;
  assembling a bearing assembly comprising a unique combination of components including one of the plurality of chock sets and liners, said bearing assembly used to support one of the plurality of work rolls within a mill stand, said assembling occurring at a site remote from the mill stand, wherein the bearing assembly and the one of the plurality of work rolls forms a mill stand assembly;

reading a plurality of RFID tags associated with the mill stand assembly and compiling information relating to one or more components of the mill stand assembly;

inserting the mill stand assembly into the mill stand;

using a mill stand controller to access information relating to the mill stand assembly, wherein said information is used by the controller to make a physical adjustment to a mill stand component so as to improve rolled product quality;

performing a rolling campaign using the mill stand;

upon completion of the rolling campaign, removing the mill stand assembly from the mill stand;

returning the mill stand assembly to the remote site;

reading the plurality of RFID tags associated with the mill stand assembly;

performing an operation upon one or more of the mill stand assembly components, said operation changing a physical characteristic of said one or more of the mill stand assembly components; and updating information relating to said one or more of the mill stand assembly components based on said performing an operation.

12. The method of claim 11 wherein said reading of the plurality of tags occurs at the remote sites or at the mill stand or both.

13. The method of claim 11 wherein an RFID tag reader is attached to the mill stand and the reader interrogates one or more of the RFID tags of the mill stand assembly during said inserting step.

14. The method of claim 11 wherein the mill stand controller moves the bearing assembly up or down within a mill stand housing based on said information.

15. The method of claim 11 wherein said performing an operation includes machining or replacing one of the plurality of liners during a repair procedure.

* * * * *